M. A. GARRETT.
AIR BRAKE ANGLE COCK CONNECTION AND SUPPORT.
APPLICATION FILED APR. 1, 1910.
960,890.
Patented June 7, 1910.
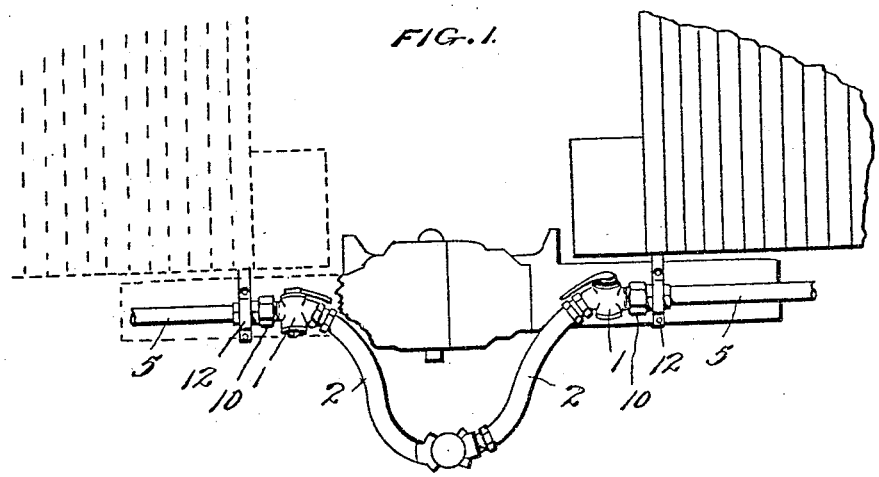
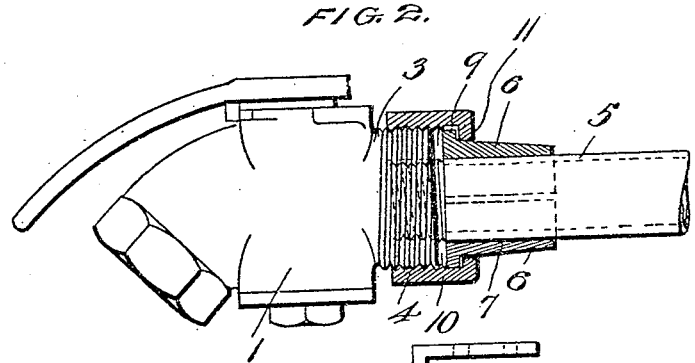
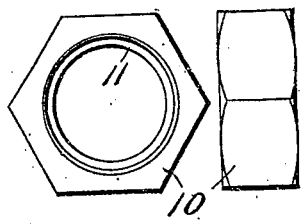
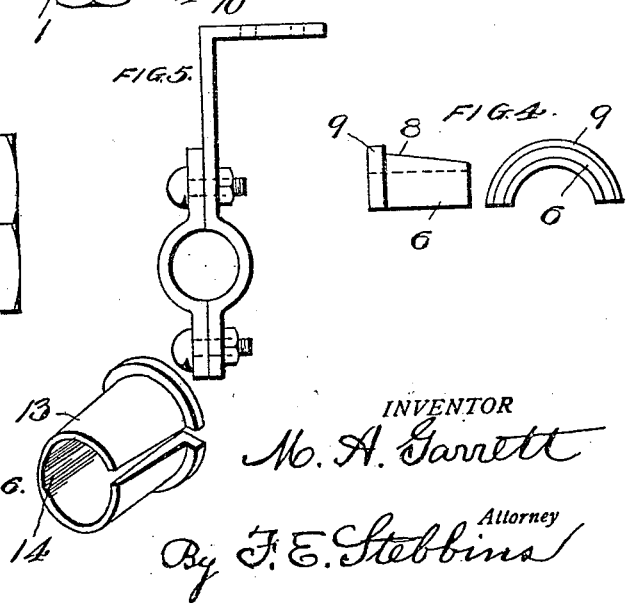
WITNESSES
Chas. K. Davis
Ralph Wormell
INVENTOR
M. A. Garrett
By J. E. Stebbins
Attorney
ANDREW B. GRAHAM CO., PHOTO-LITHOGRAPHERS, WASHINGTON, D.C.

UNITED STATES PATENT OFFICE.

MYERS A. GARRETT, OF CHICAGO, ILLINOIS.

AIR-BRAKE ANGLE-COCK CONNECTION AND SUPPORT.

960,890.  Specification of Letters Patent.  Patented June 7, 1910.

Application filed April 1, 1910. Serial No. 552,802.

*To all whom it may concern:*

Be it known that I, MYERS A. GARRETT, a citizen of the United States, residing at Chicago, in the county of Cook and State of Illinois, have invented certain new and useful Improvements in Air-Brake Angle-Cock Connections and Supports; and I do hereby declare the following to be a full, clear, and exact description of the invention, such as will enable others skilled in the art to which it appertains to make and use the same.

In air brake mechanism the angle cock has secured to one of its ends the flexible hose and coupling, and the other end is interiorly threaded to receive the exteriorly threaded end of the train pipe. The pipe is weakened to such a degree by the threads that should the angle cock be subjected to undue or excessive strains, as often happens, the pipe breaks at the place or circular line adjacent its connection with the angle cock. Such breakage renders the air brake inoperative, the angle cock, hose and coupling often are lost, and considerable expense for repairs becomes necessary. Further, the Master Car Builders' standards for the application of air brakes to cars specifies the location of the train pipe and angle cock relative to the coupler and the angular disposition of the angle cock to a vertical plane, and it is desirable that they shall be held in their proper positions.

The object of my invention is, first, the provision of means constituting an improved connection or union of the angle cock and pipe which shall transmit and distribute the strains from the angle cock to the relatively strong part of the pipe back of the threaded end portion; and, secondly, the provision of means for holding the angle cock in its proper position on the car and relative to the coupler.

With these ends in view, my invention consists in certain novelties of construction and combinations of parts as hereinafter set forth and claimed.

The accompanying drawings illustrate an example of the physical embodiment of the invention, and one slight modification, constructed according to the best mode I have so far devised for applying the principle.

Figure 1 is a side view in elevation of the ends of two coupled cars, one being in dotted lines, showing the train pipes and flexible hose couplings and my improved means for uniting the angle cock and train pipe and also supporting the same. Fig. 2 shows in side view an angle cock and train pipe and in section the clamping or connecting means. Fig. 3 illustrates two views of the clamping nut. Fig. 4 shows two views of a gib. Fig. 5 shows the hanger. Fig. 6 shows a gib of modified shape.

Referring to the figures, the numeral 1 designates an angle cock the interior construction of which is well known; 2, a flexible hose secured to one end thereof; 3, the end of the angle cock adjacent the train pipe, which former is interiorly threaded; 4, the exterior threads on the angle cock; 5, the end of the train pipe exteriorly threaded; 6, 6, two gibs, each having a curved interior surface 7 to fit the exterior surface of the pipe, an inclined exterior surface 8, and, when preferred, a flange 9 of the shape shown at one end; 10, a clamping nut interiorly threaded and externally of a hexagon or angular shape to receive a wrench; 11, an inwardly extended circular flange at one end of the nut; and 12 a two part hanger or support, one part having one end bent at right angles to the other portion thereof and perforated to receive bolts or rivets for securing the same to a car, and a curved seat to receive the pipe, and the other part having a similar curved seat for the pipe and adapted to be detachably secured to the other part by bolts, the pipe or gib or gibs being held between the parts, as shown.

In assembling the several parts the gibs are inserted within the nut and both passed over the end of the train pipe, the angle cock is then screwed upon the end of the pipe, and finally the nut is screwed onto the angle cock. The circular flange 11 of the nut is of such a diameter that it frictionally engages the inclined surface or surfaces 8 of the gib or gibs intermediate the ends thereof so that as the nut is screwed on the angle cock the gibs are forced against the exterior surface of the pipe; and the proportion of parts is such that preferably the gibs at their ends shall not bear against the ends of the angle cock when the nut is seated. The threads upon the exterior of the angle cock and the interior of the nut are so disposed that the nut screws on the angle cock in the same direction as that in which the angle cock is screwed on the pipe whereby the parts are locked together. Obviously, the angle cock and end of the train pipe will retain their fixed positions under all conditions of normal service, the angle cock cannot become unscrewed from the train pipe, and any strains imparted to the angle cock at an angle to the length of the train pipe will be transmitted to the train pipe back of the threaded end thereof and thence to the hanger and the car. The clamping nut and the gibs or gib bridge the line or space between the end of the angle cock and the ends of the gibs or end of the gib so that the threaded portion of the train pipe cannot be subjected to any substantial strains.

In Fig. 6 I have shown a modified form of gib 13 which is in one piece, the opposite halves being united by a relatively thin portion of metal 14 which bends and allows the interior curved surfaces to be forced into contact with the exterior surface of the train pipe. The gib or gibs may project far enough from the clamping nut to be engaged by the hanger, and, when so engaged, the pipe, angle cock and clamping and strengthening means are held in fixed positions.

It is clear from the foregoing description that I have provided an efficient means constituting an improved connection or union which will prevent the breaking off of the train pipe adjacent to the angle cock, and a support for the angle cock and pipe, which fulfils the conditions specified as the objects of my invention.

What I claim is:

1. The combination with a car provided with means for supporting an air brake angle cock and train pipe, of an angle cock interiorly and exteriorly threaded at one end, a threaded train pipe engaging the interior threads of the angle cock, a gib on the train pipe, and an interiorly threaded clamping nut with a flange engaging the exterior surface of the gib and said clamping nut screwed upon the angle cock.

2. The combination with an angle cock interiorly and exteriorly threaded at one end, of a threaded train pipe engaging the interior threads of the angle cock, a plurality of gibs each with an inclined exterior surface and an interior surface engaging the train pipe, and an interiorly threaded clamping nut having a flange engaging the exterior inclined surfaces of the gibs and screwed upon the angle cock; means being provided for supporting the angle cock and pipe upon a car.

3. The combination with an angle cock exteriorly and interiorly threaded, of a train pipe with a threaded end engaging the interior threads of the angle cock, a gib on the train pipe, and an interiorly threaded clamping nut screwed upon the angle cock and engaging the gib and forcing it upon the train pipe.

4. The combination with an angle cock exteriorly and interiorly threaded, of a train pipe with a threaded end engaging the interior threads of the angle cock, a gib on the train pipe, and an interiorly threaded clamping nut screwed upon the angle cock and engaging the gib; the disposition of the threads on the angle cock and train pipe and clamping nut being such that the nut is screwed onto the angle cock by turning it in the same direction as the angle cock is turned in screwing it onto the train pipe.

5. The combination with a threaded angle cock and threaded train pipe connected by a threaded clamping nut and a gib rearwardly extended from the clamping nut, of a hanger secured at one end to the car and the opposite end engaging the gib.

In testimony whereof I affix my signature, in the presence of two witnesses.

MYERS A. GARRETT.

Witnesses:
  MAUD C. STEBBINS,
  N. B. MACHATTON.